United States Patent
Prakash et al.

(10) Patent No.: US 10,270,850 B2
(45) Date of Patent: Apr. 23, 2019

(54) GROUP REFORMATION MECHANISM FOR REDUCING DISRUPTION TIME IN WIRELESS PEER TO PEER NETWORKS

(71) Applicant: NEC Corporation, Tokyo (JP)

(72) Inventors: Chaki Prakash, Tokyo (JP); Masato Yasuda, Tokyo (JP); Norihito Fujita, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/123,575

(22) PCT Filed: Mar. 3, 2014

(86) PCT No.: PCT/JP2014/001160
§ 371 (c)(1),
(2) Date: Sep. 2, 2016

(87) PCT Pub. No.: WO2015/132813
PCT Pub. Date: Sep. 11, 2015

(65) Prior Publication Data
US 2017/0078382 A1 Mar. 16, 2017

(51) Int. Cl.
*H04W 84/20* (2009.01)
*H04L 29/08* (2006.01)
(Continued)

(52) U.S. Cl.
CPC ...... *H04L 67/1051* (2013.01); *H04L 67/1044* (2013.01); *H04L 67/1048* (2013.01);
(Continued)

(58) Field of Classification Search
None
See application file for complete search history.

(56) References Cited

U.S. PATENT DOCUMENTS

| 9,220,050 B2 * | 12/2015 | Kelsey | H04W 40/244 |
| 2002/0015402 A1 * | 2/2002 | Hughes | H04L 45/00 370/347 |

(Continued)

FOREIGN PATENT DOCUMENTS

| JP | 2004-129042 A | 4/2004 |
| JP | 2006-148448 A | 6/2006 |
| WO | WO-2013/162496 A1 | 10/2013 |

OTHER PUBLICATIONS

International Search Report corresponding to PCT/JP2014/001160, dated May 20, 2014 (3 pages).

(Continued)

*Primary Examiner* — Joshua Joo
(74) *Attorney, Agent, or Firm* — Wilmer Cutler Pickering Hale and Dorr LLP

(57) ABSTRACT

A method to reduce group reformation time and maintain seamless connectivity in a peer-to-peer network at the time of disappearance of the Group Owner (GO). Each of the nodes is provided with an emergency leader list which prioritizes a predetermined number of emergency leader nodes each of which is a client node having intent of acting as an emergency leader, wherein the emergency leader list is prepared right at the time of group formation. The emergency leader nodes broadcast beacons when a leader node disappears from the group without notice. Each of the client nodes barring a first-priority emergency leader node of the emergency leader list connects to a highest priority one of emergency leader nodes detected by the client node.

18 Claims, 14 Drawing Sheets

(51) Int. Cl.
*H04W 8/18* (2009.01)
*H04W 4/06* (2009.01)
*H04W 12/04* (2009.01)
*H04W 88/04* (2009.01)

(52) U.S. Cl.
CPC ............. *H04W 4/06* (2013.01); *H04W 8/186* (2013.01); *H04W 12/04* (2013.01); *H04W 84/20* (2013.01); *H04W 88/04* (2013.01)

(56) References Cited

U.S. PATENT DOCUMENTS

| | | | |
|---|---|---|---|
| 2002/0055978 A1 | 5/2002 | Joon-Bo et al. | |
| 2004/0179488 A1 | 9/2004 | Kim et al. | |
| 2005/0086273 A1 | 4/2005 | Loebbert et al. | |
| 2005/0198359 A1* | 9/2005 | Basani | H04L 67/1095 709/232 |
| 2006/0106963 A1 | 5/2006 | Sasaki et al. | |
| 2009/0262689 A1* | 10/2009 | Jeong | H04W 40/22 370/329 |
| 2012/0173620 A1* | 7/2012 | Holostov | H04L 67/1048 709/204 |
| 2012/0252354 A1* | 10/2012 | Itoh | H04W 48/16 455/7 |
| 2012/0278389 A1 | 11/2012 | Thangadorai | |
| 2013/0278412 A1* | 10/2013 | Kelly | G08B 26/00 340/539.1 |
| 2013/0339504 A1* | 12/2013 | Montemurro | H04W 12/06 709/223 |
| 2014/0003286 A1* | 1/2014 | Estevez | H04W 84/18 370/254 |
| 2014/0201280 A1* | 7/2014 | Qi | H04W 84/20 709/204 |
| 2015/0127733 A1* | 5/2015 | Ding | H04W 4/08 709/204 |
| 2015/0163300 A1* | 6/2015 | Kumar | H04L 67/1046 709/205 |

OTHER PUBLICATIONS

Written Opinion corresponding to PCT/JP2014/001160, dated May 20, 2014 (5 pages).
Japanese Office Action issued by the Japan Patent Office for Japanese Application No. 2016-555391 dated Jul. 12, 2017 (5 pages).

* cited by examiner

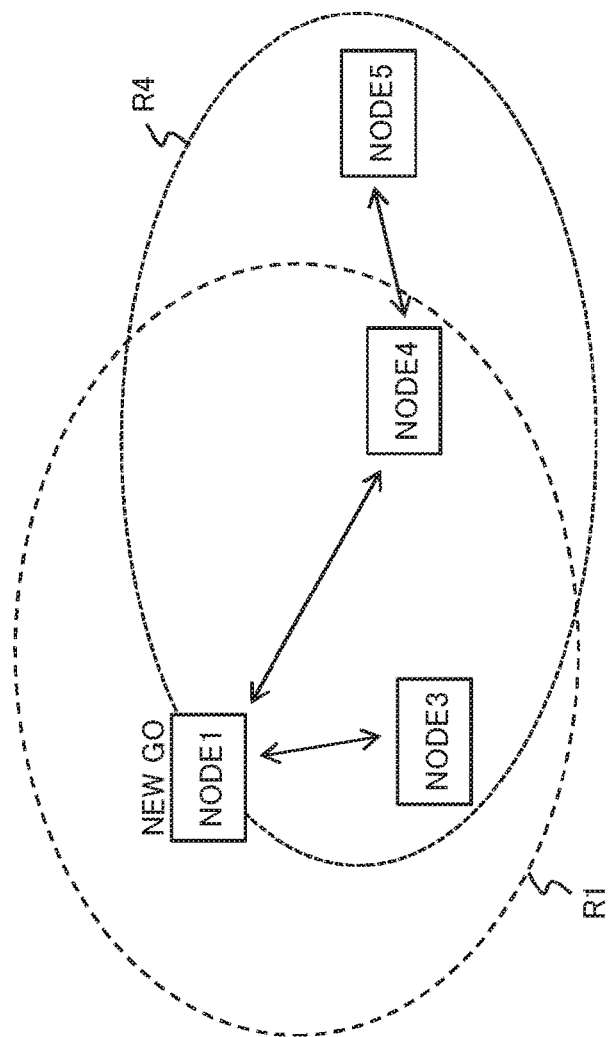

GROUP REFORMATION MECHANISM FOR REDUCING DISRUPTION TIME IN WIRELESS PEER TO PEER NETWORKS

CROSS-REFERENCE TO RELATED APPLICATION

This application is a national stage application of International Application No. PCT/JP2014/001160 entitled "Group Reformation Mechanism for Reducing Disruption Time in Wireless Peer to Peer Networks," filed on Mar. 3, 2014, the disclosure of which is hereby incorporated by reference in its entirety.

TECHNICAL FIELD

The present invention relates to the field of wireless communication systems, and more particularly to group reformation method and system in wireless peer-to-peer (P2P) networks.

BACKGROUND ART

Wi-Fi Direct Standard, released and maintained by the Wi-Fi Alliance, is a recent advancement in the field of device to device communication in a peer-to-peer manner without requiring a centralized Access Point. By taking off the specialized hardware functionalities that a traditional AP possesses in an Infrastructure-mode IEEE 802.11 based WLAN to software, any device can be enabled with the functionality of AP. By using this basic feature, Wi-Fi Direct does away with the need for AP and empowers nodes to form a group among themselves without requiring Internet connectivity. Such peer-to-peer groups in Wi-Fi Direct are managed by a leader defined as Group Owner (GO) in the standard specification. The leader is selected by GO negotiation. Once a group is formed, the GO plays the role of traditional AP; sends out periodic beacons and routes data packets from one node to other. The current version of the standard does not address the problem of group disruption that is caused when the GO leaves a Group without getting sufficient time to inform its clients. The client nodes suffers from outage caused by absence of GO before they rediscover each other and negotiate to form a new group which takes considerable amount of time. This essentially leads to decay in throughput and increase in latency.

The problem of disruption in the service of the clients in the absence of the GO calls for a solution that will enable the clients remain seamlessly connected to each other without putting any additional responsibility on the GO. There can be a wide variety of reasons that can force a GO to leave the group which can be broadly categorized into two: (a) case of sudden link failure caused by random behavior of wireless channel, mobility, abrupt power shutdown or disaster/natural catastrophe; and (b) Selfish GO. A selfish GO is one who leaves the group to join a new group as soon as his service requirement from the group is met. In traditional Infrastructure-based Wi-Fi, Access Points are hardware that needs to be active as long as its associated clients are active. But in peer-to-peer networks like Wi-Fi Direct where the GO can be a human-intervened device like laptop computer or smart phones, the case of Selfish GO can be quite a common scenario. At the same time, it will also be unfair on the part of the GO if it is asked to continue its service of group management even though it is no longer in need of any service from the group and requires an urgent service that is not available in the current group and needs it to join another group. Devices join a peer-to-peer group when they need each other's service; if any client device is allowed to leave a group freely once its service requirement is met, then the same rule should hold for the GO as well. The original motivation behind Wi-Fi Direct being to generalize the role of the AP by enabling any device to act as GO, the next step should be to further generalize it in the way that the GO should also be allowed to leave the group anytime like any other node in the group.

There are a couple of publications in the related art to propose an exit scheme for the leaving GO without disrupting the current group. But these publications focus on cases where the GO opts to quit and chooses its successor and systematically hands over the GO-ship before leaving. For example, PTL 1 (US 2012/0278389 A1) discloses a scheme where the leaving GO asks for GO intent from multiple clients before it decides to quit and selects the most suitable node out of all the nodes who reply with an intent to become the next GO. The information about the new GO is then shared by the leaving GO before it leaves. PTL 2 (WO2013162496 A1) discloses a scheme where the leaving GO asks for intent of successorship from the group members and prepares a list of successor GOs, which may be prioritized based on credentials and shares the list with the group members before leaving.

CITATION LIST

Patent Literature

[PTL 1]
US 2012/0278389 A1
[PTL 2]
WO2013162496 A1

SUMMARY

Technical Problem

However, the scheme proposed by PTL 1 implicitly makes the assumption that the leaving GO has sufficient time to choose the successor before it leaves, thus it fails in the scenario where the GO suddenly disappears due to a sudden event like, disaster, abrupt power failure, mobility, random behavior of wireless channel or selfish GO case as discussed above. The scheme proposed by PTL 2 is also flawed with the same issue as it fails to address the problem created by sudden disappearance of GO. Also, although it proposes to share a list of multiple successor nodes before leaving, it does not justify the reason or benefit of doing that as all nodes connect to the 1st node in the list. So, there is no advantage associated to preparing and sharing a list of multiple successor nodes. Thus, in essence, it degenerates to the first idea itself.

It is an object of this invention to maintain inter-connectivity in peer-to-peer networks when its network leader leaves unexpectedly.

It is another object of this invention to generalize the role of the network leader and enables it to leave a group as and when it wants just like any other client node in the peer-to-peer group.

In addition to the objects mentioned, other obvious and apparent advantages of the invention will be reflected from the detailed specification and drawings.

Solution to Problem

To address the problem of sudden disruption in group following an unexpected disappearance of the leader due to a wide range of possible reasons, we propose that intent to become an emergency leader is shared in the group right at the time of group formation. In the case where a new client is added to its group, the leader may prepare and update a list of emergency leaders based on the emergency leader intent and metric. The list may be periodically shared (or immediately shared if a change is made in the list) with the associated clients throughout the duration of group session instead of waiting for the pre-decided time of exit by the leader. The clients save the last received emergency leader list.

A method according to the present invention is a method for controlling group reformation in a wireless peer-to-peer group of nodes, wherein one of the nodes acts as a leader and others act as clients of the group, the method comprises: providing the nodes with an emergency leader list which prioritizes a predetermined number of emergency leader nodes each of which is a client node having intent of acting as an emergency leader; broadcasting beacons from the emergency leader nodes when a leader node disappears from the group without notice; and connecting each of the client nodes barring the first-priority emergency leader node of the emergency leader list to a highest priority one of emergency leader nodes detected by the client node.

A system according to the present invention is a system for controlling group reformation in a wireless peer-to-peer group of nodes, wherein one of the nodes acts as a leader and others act as clients of the group, wherein each of the nodes is provided with an emergency leader list which prioritizes a predetermined number of emergency leader nodes each of which is a client node having intent of acting as an emergency leader; the emergency leader nodes broadcast beacons when a leader node disappears from the group without notice; and each of the client nodes other than a first-priority emergency leader node of the emergency leader list connects to a highest priority one of emergency leader nodes detected by the client node.

Advantageous Effects of Invention

According to the present invention, inter-connectivity can be quickly restored in peer-to-peer networks when its network leader leaves unexpectedly.

The invention accordingly comprises the several steps and the relation of one or more of such steps with respect to each of the others, and the apparatus embodying features of construction, combinations of elements and arrangement of parts that are adapted to affect such steps, all is exemplified in the following detailed disclosure, and the scope of the invention will be indicated in the claims.

BRIEF DESCRIPTION OF DRAWINGS

FIG. 2 is a schematic diagram showing an example of an EGO list provided in a node according to an embodiment of the present invention.

FIG. 14 is a schematic diagram showing another example of possible network topologies of the system to explain the operation of the embodiment.

DETAILED DESCRIPTION

Hereinafter, an exemplary embodiment of the present invention will be described according to WiFi Direct Standard as an example. The exemplary embodiment is discussed in its complete details with accompanying figures and finally explained with a typical example scenario.

As described before, in order to solve the problem of sudden disruption in group following an unexpected disappearance of the leader (GO: Group Owner), an intent to become an emergency leader (EGO: Emergency Group Owner) is shared in the connection request frames right at the time of Group formation. As the GO keeps adding new clients to its group, based on the EGO intent and EGO metric, it keeps preparing and updating a list of k EGO nodes. The list is periodically shared with the associated clients throughout the duration of group session instead of waiting for the pre-decided time of exit by the GO. The clients save the last received EGO list.

The nodes in the EGO list are arranged in priority order decided by the GO following an algorithm which is explained in details in the forthcoming section.

As and when the GO disappears, the EGOs become autonomous Group Owners and start transmitting beacons. Among all the received EGO beacons, a client connects to the EGO with highest EGO metric preferably by sending invitation using the credentials (security key) of the previous session. By doing so, it skips the GO negotiation and the initial part of WPS (Wireless Protected Setup) Provisioning Phase for generation of authentication key by the Internal Registrar and sharing with the Enrollee. This reduces the reconnection time considerably. In a small network where every node is in each other's transmission range, all clients will invariably end up connecting to the first EGO. The remaining EGOs also join the first EGO as normal client. But in a large distributed network, if any client fails to find the first EGO, it connects to the next priority EGO from the list. In such special cases, the lesser priority EGO acts as a relay node between the first EGO and the far-away client by alternately switching connection between the client and first EGO. If no client connects to a particular EGO, it joins the first-priority EGO as a normal client. Thus, even after the GO leaves suddenly without any prior information, the associated clients are not left separated; neither do they need to start forming a group from scratch. Accordingly, the method serves the purpose of reducing latency and increasing throughput in applications that require continuous connectivity for streaming or sharing files of large sizes.

1. System Configuration

Figure 1:
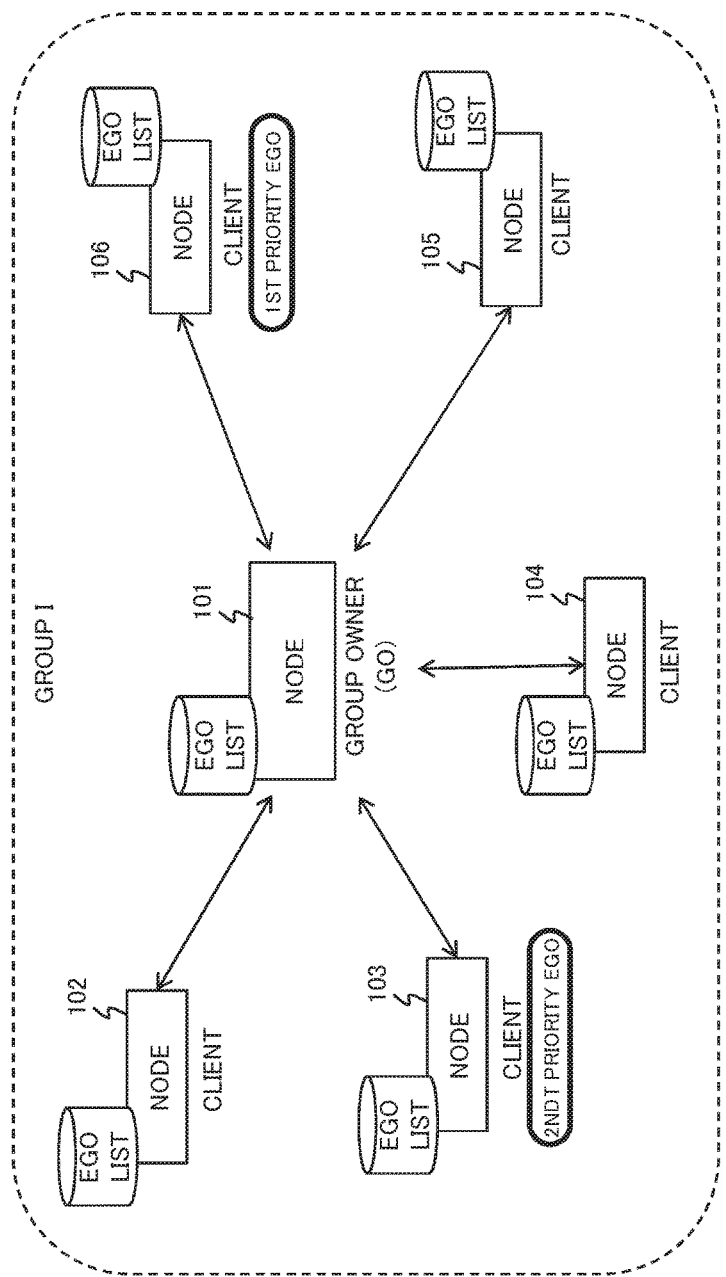
FIG. 1 is a schematic diagram showing a wireless peer-to-peer (P2P) network according to an embodiment of the present invention.

As shown in FIG. 1, it is assumed for simplicity that six nodes 101-106 forms a typical WiFi Direct group with the proposed mechanism, in which the node 101 operates as a Group Owner (GO) and other nodes 102-106 operate as associated clients, respectively. The GO node 101 plays the role similar to an Access Point (AP) in traditional Infrastructure based Wi-Fi, alongside maintains a list of Emergency Group Owners (EGO list). As described later, the EGOs are selected based on EGO metrics of all the clients with the EGO intent of being an Emergency Group Owner. The EGO list is shared with the client nodes 102-106 every time it is refreshed, else periodically.

Figure 2:
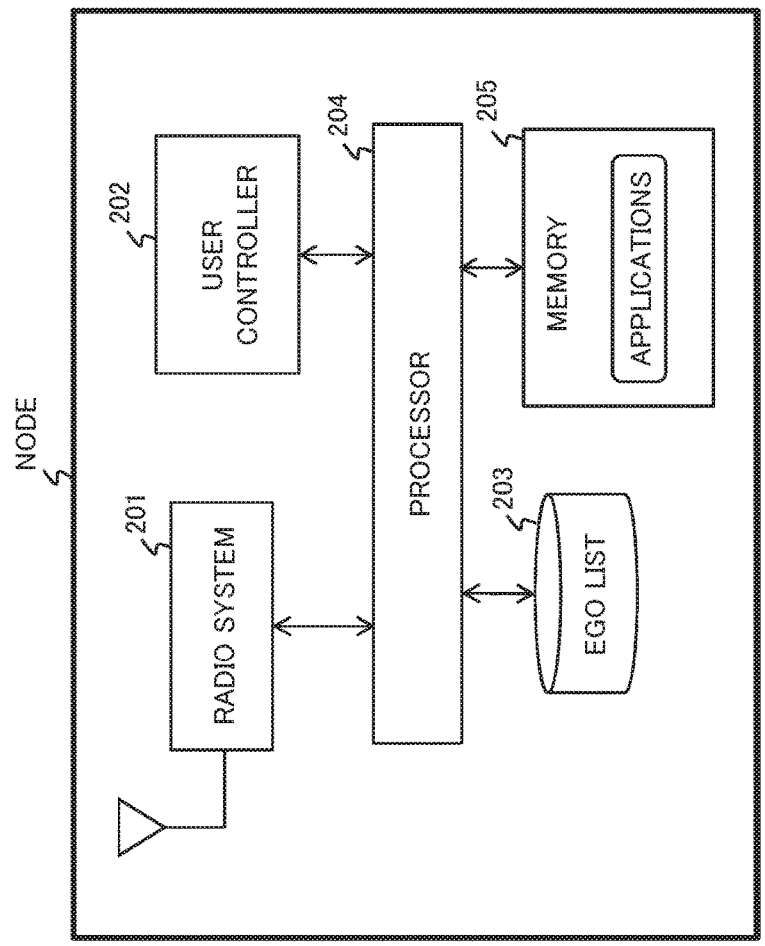
FIG. 2 is a block diagram showing the functional configuration of a node according to an embodiment of the present invention.

Referring to FIG. 2, the nodes 101-106 have the same configuration but may operate as GO or Client. The node includes the following functionalities: a radio system 201, a user controller 202, an EGO list 203, a processor 204, and a memory 205. The radio system 201 includes a WiFi Direct communication function. The user controller 202 controls WiFi Direct connection procedures such as Device Discovery, GO Negotiation and Provisioning Service Discovery. The EGO list 203 contains EGOs which are selected according to an algorithm that compares EGO metrics of all clients with non-zero EGO intent. The processor 204 can execute the operating system and applications stored in the memory 205 including group reformation according to the present embodiment. The EGO list 203 may be included in the memory 205 or a separate storage device such as a semiconductor memory.

Figure 3:
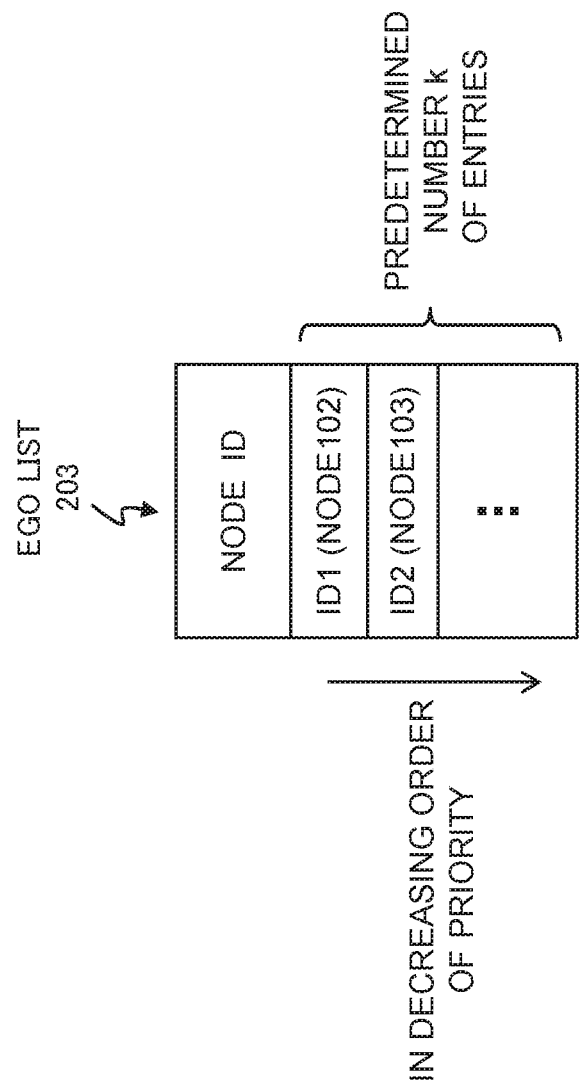

Referring to FIG. 3, the EGO list 203 contains at least information of EGOs which are identified by node identification (e.g. MAC address) and prioritized. The EGO priority can be determined based on factors like the position index of an EGO, power availability, device type, processing speed, memory size, antenna gain etc. It is preferable to restrict the maximum number of entries in the EGO list 203. As described later, the EGO list 203 is created at the GO node and is shared with all the associated client nodes, allowing the client nodes to perform group reformation at the time of the disappearance of the GO.

2. Group Reformation

Figure 4:
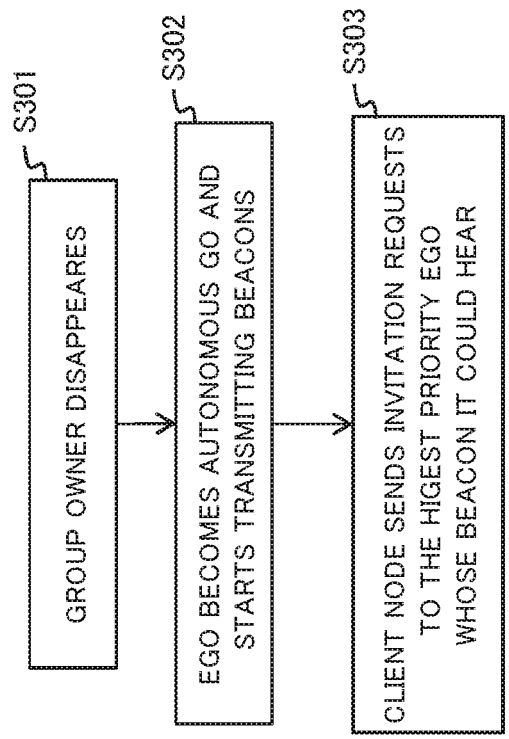
FIG. 4 is a flowchart showing a group reformation method according to an embodiment of the present invention.

Referring to FIG. 4, when it is detected that the GO disappears (Operation S301), each EGO node becomes autonomous GO and starts transmitting beacons (Operation S302). Each client node sends invitation requests to the highest-priority EGO whose beacon it could hear (Operation S303). If a client node fails to hear the beacon of the highest-priority EGO, the client node connects to the next-priority EGO in the EGO list 203. In this case, the next-priority EGO acts as a relay node between the client node and the new GO (the highest-priority EGO) by alternately switching between two states: disconnecting from one; and connecting to the other.

In a different example, the EGOs may not require to send beacon broadcast. When the GO leaves, all the members of the group starts P2P find operation to discover each other. Each client node then connects to the highest priority EGO whom it could hear.

Taking the network topology as shown in FIG. 1 as an example, an outline of the group reformation will be described by references to FIGS. 5-7. It is assumed that the client node 106 is the highest-priority EGO and the client node 103 is the next-priority EGO in the EGO list 203.

Figure 5:
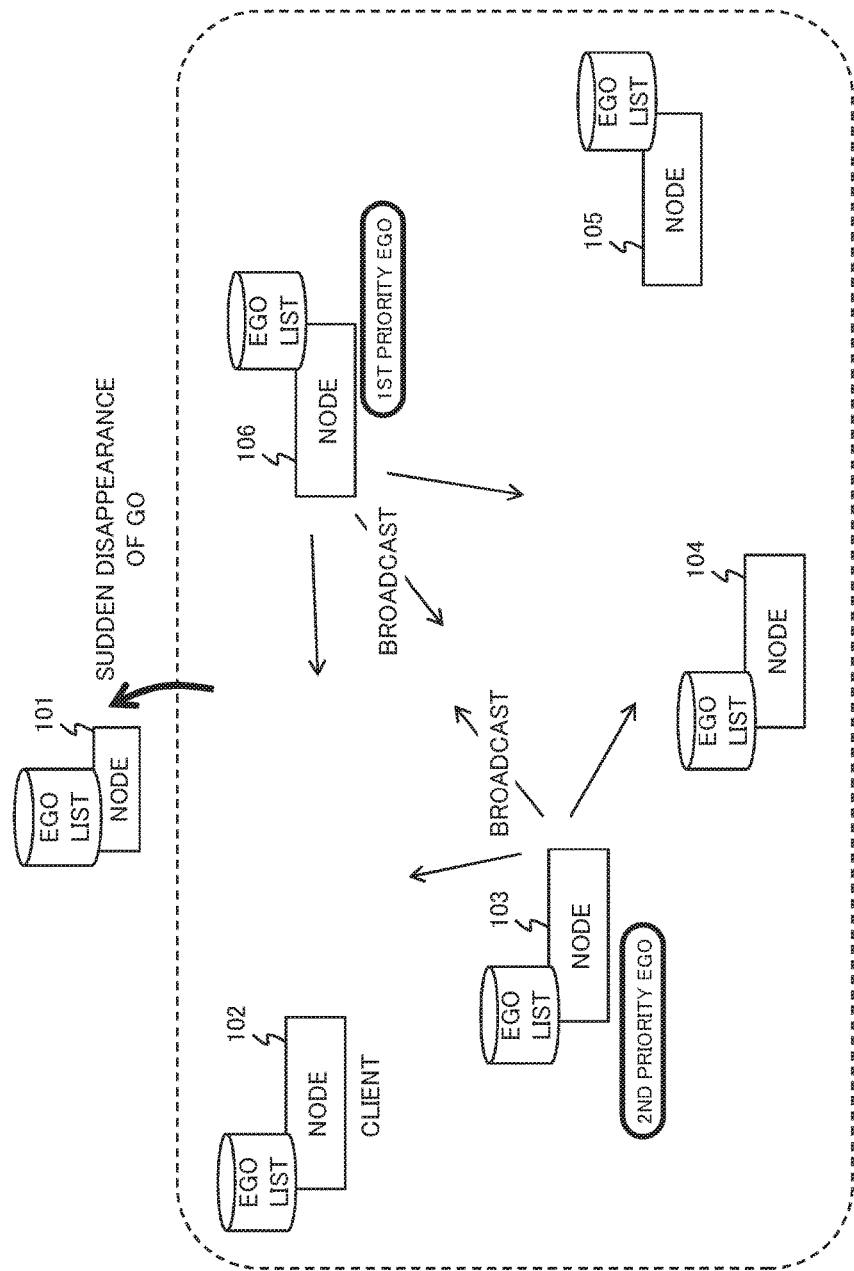
FIG. 5 is a schematic diagram showing an example of group reformation of the network when GO disappears suddenly according to the embodiment of the present invention.

Referring to FIG. 5, when the GO node 101 suddenly disappears, the EGO nodes 103 and 106 start broadcasting beacons on the same operating channel using CSMA/CA mechanism. Among all the received beacons, all the client nodes try to find the node 106 with highest priority as saved in the EGO list. Clients keep listening to the beacons in every beacon interval, and switches to a higher priority GO, if it finds any.

Figure 6:
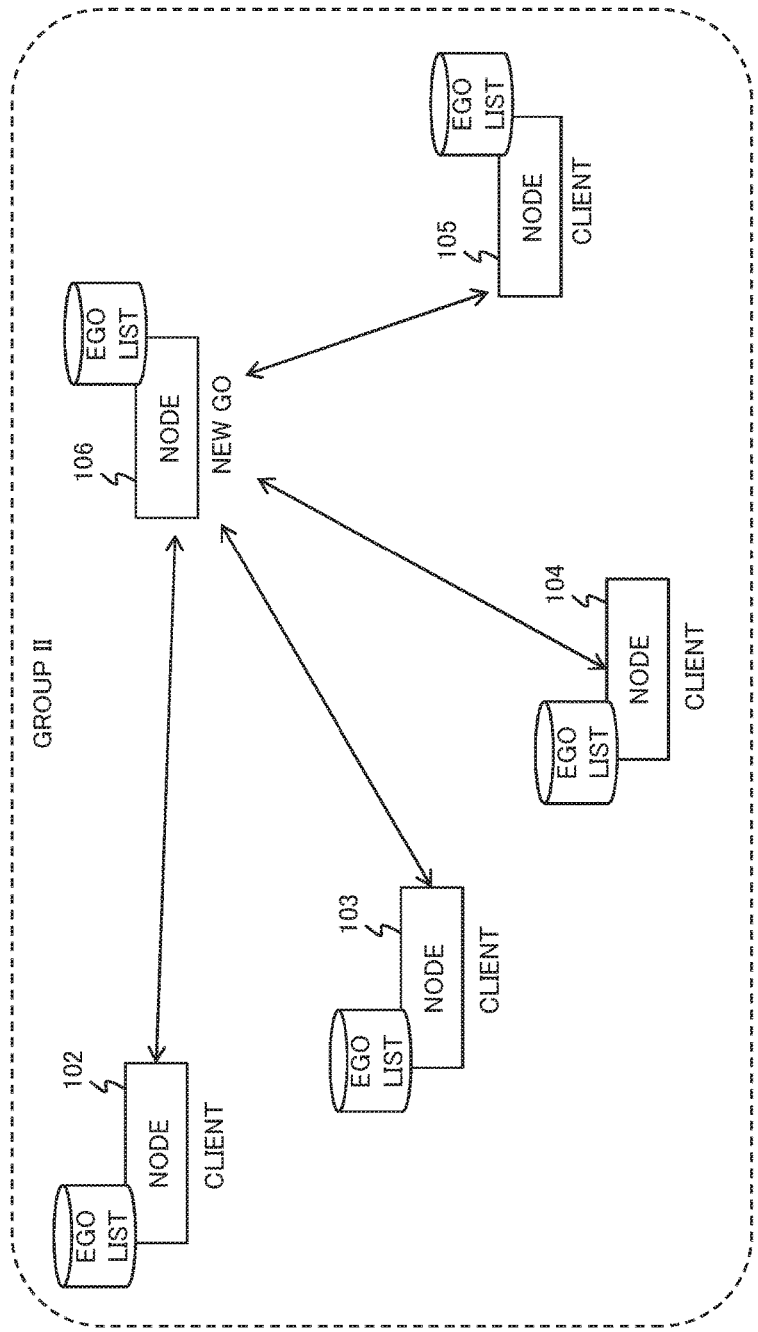
FIG. 6 is a schematic diagram showing an example of possible network topologies of the system according to the embodiment of the present invention.

As shown in FIG. 6, when all the client nodes 102-105 have successfully found the EGO node 106 with highest priority, the nodes 102-105 connect to the new GO node 106. FIG. 6 shows a Wi-Fi Direct Group II where the GO node 106 has taken up the responsibility of Emergency GO being the Highest Priority node in the EGO list. Also, in a simpler network scenario, where all client nodes 102-105 can hear the beacon of the EGO node 106, all of them can connect to the EGO node 106 using P2P invite reusing the security keys of the previous session. For re-starting a persistent group, the EGO(s) can artificially generate a configuration file containing the network id of the previous session and MAC addresses of all the members of the previous session. The clients can also artificially generate a configuration file containing the credentials of a virtual past session with the EGO as the GO, i.e., with the EGO's MAC address as the BSSID. This will enable the EGO to behave as if it was the GO of the previous session and all other clients can simply send an invitation request to re-start the persistent group. Creation of such a persistent group is aimed at reducing the reconnection time.

However, when the EGO node 106 is unreachable from a client node, that node will try to connect to the lower priority EGOs. As shown in FIG. 7, it is assumed that the client node 102 fails to hear the beacon of the EGO node 106 and hence connects to the next priority EGO node 103. As all EGOs are reachable from each other, the client node 103 acts as a relay node between the client node 102 and the new GO node 106. The details of this operation will be discussed next.

When the EGO node 106 takes over as GO, it waits for joining request from all the clients of previous group I. If it comes to know through some other lower priority EGO that unfortunately a few of the clients have not been able to listen to its beacon, it halves its transmission rate.

Figure 7:
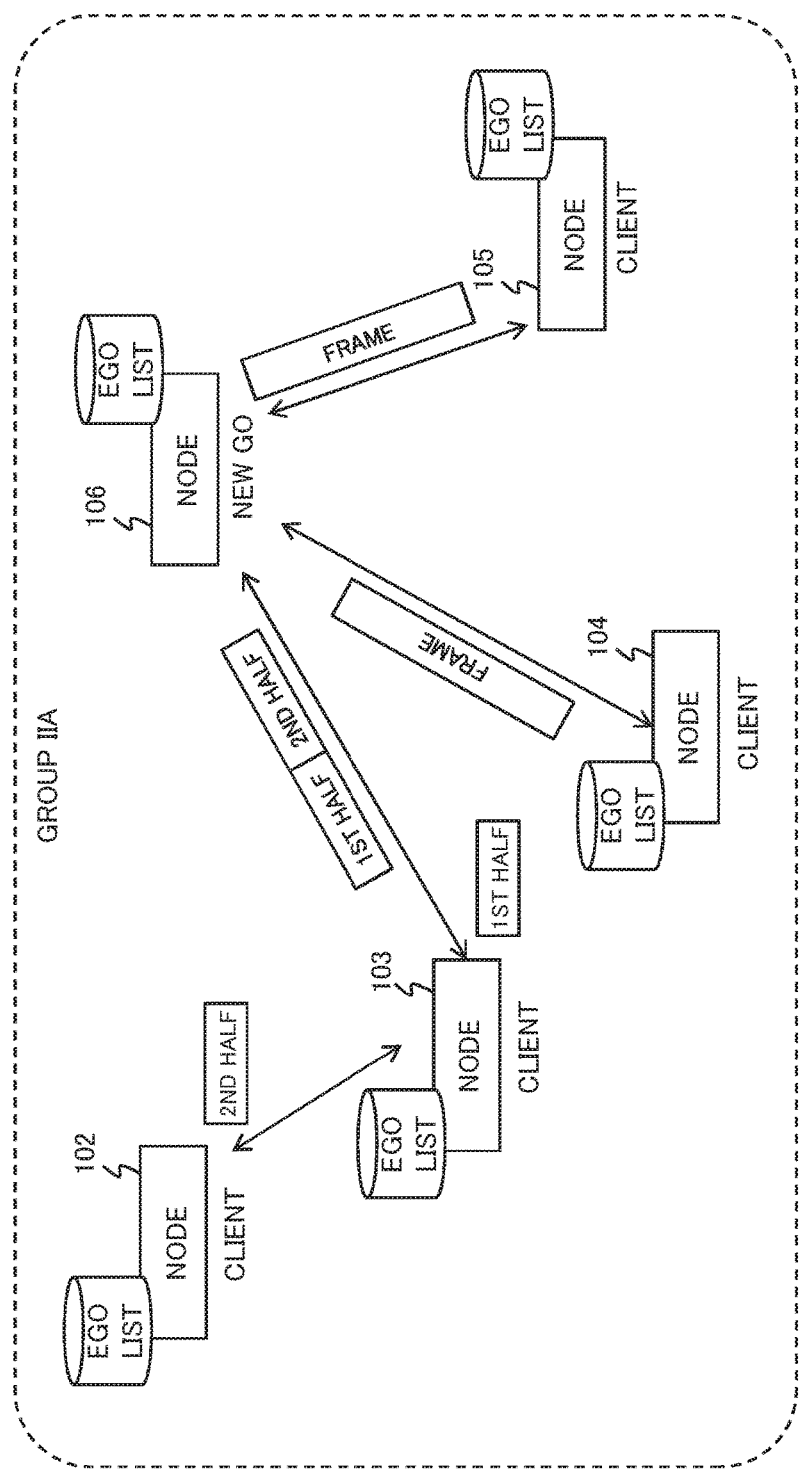
FIG. 7 is a schematic diagram showing another example of possible network topologies of the system according to the embodiment of the present invention.

More specifically, as shown in FIG. 7, the new GO node (i.e., the EGO node 106) transmits data in complete time-superframes to the ordinary client nodes 104 and 105. A time superframe is a collection of multiple time slots. However, the new GO node 106 transmits data to the lower-priority EGO node (here, client node 103) only for a fraction (here, half) of one complete time-superframe. Specifically, out of the one complete time-superframe, the new GO node 106 transmits data for the first half, and turns off for the second half, thus allowing the lower priority EGO node 103 to receive the data for the first half and forward the data for the second half to the remote client nodes (here, only node 102) on the same channel by using a collision avoidance scheme like CSMA/CA with RTS-CTS mechanism. In other words, the lower-priority-EGO acts as a relay following a mechanism of alternately connecting and disconnecting from the first-priority EGO node 106 and the remote client 102. In the first half of timeframe, the second-priority EGO node 103 receives the message from the first-priority EGO node 106 by remaining as a client in its group. But, in the second half, it disconnects from the first-priority EGO node 106 and forms a group with the remote client 102 to re-transmit the information. This mechanism significantly increases the robustness of the system in terms of reaching out to maximum number of nodes, if not all, in a typical wide area deployment of WiFi Direct based P2P network prone to disasters and node mobilities.

3. Ego-List Creation and Ego Selection

As described before, at the time of formation of a new group I, the nodes intending to form a group include their EGO intent in the connection request frames of P2P group formation. The node (here, Node 101) who wins the GO Negotiation immediately prepares a EGO list right at the start of group based on the EGO intent (EGOi) of its peer. EGOi is a one-bit flag which is set to one (1) by the client if it wishes to act as an EGO. The EGO intent information (EGO flag) is embedded in the P2P Connect frames of P2P group formation. EGOi is included in the P2P Connect frame when two nodes come to form a group, and in the Provisioning Service Discovery frame for a node joining an existing group. Accordingly, EGO selection and EGO list creation operations will be described in these respective cases using GO negotiation and Provisioning discovery.

3.1) EGO List Creation when no Group Exists

Figure 8:
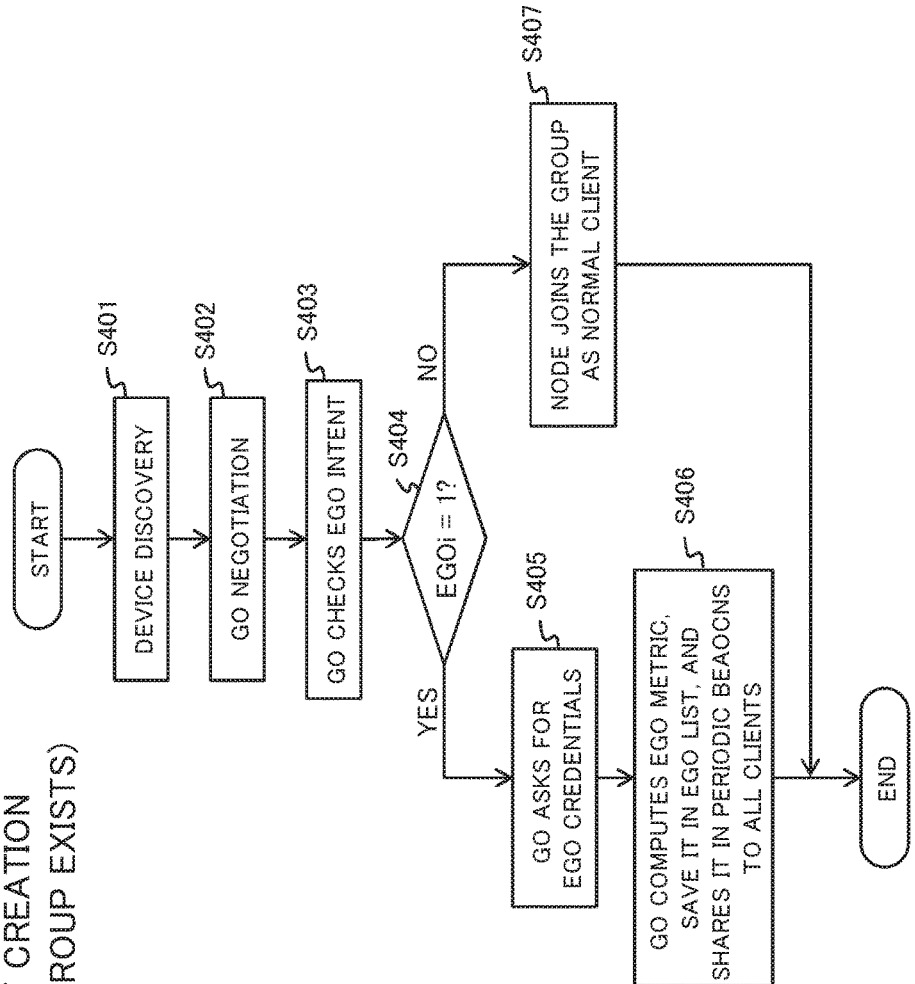
FIG. 8 is a flowchart showing the operation of creating an EGO list when no group exists according to the embodiment of the present invention.

Referring to FIG. 8, the nodes 101 and 106, for example, find each other through the Device Discovery procedure (Operation S401) and the node 101 becomes the GO of the group I through the GO Negotiation procedure (Operation S402). Both the nodes include EGOi in their connection request frames. The node who wins GO negotiation becomes the GO and checks the EGOi flag of the other node in its P2P connect frame exchanged during GO Negotiation (Operation S403). The EGOi is a one-bit flag which is set to 1 by the client if it wishes to act as an EGO. In another possible example, the GO may ask for EGO intent after group formation instead of including in the P2P connect frame.

If the GO node 101 receives EGOi=1 (non-zero) from the client node 106 (Operation S404; YES), the GO node 101 asks for EGO credentials (Operation S405). The EGO credential is the information of the client node, which may include, but not limited to: the location (potential EGOs are preferred to be equipped with GPS-like mechanism); CPU speed; primary memory; fixed or mobile in nature; remaining battery power (if mobile); antenna gain, transmission power, transmission range and maximum supported data rate.

Having received the EGO credential from the client node, the GO node 101 calculates a metric based on these received values and saves the device ID in its EGO list 203 and then shares the EGO list 203 with the client node 106 (Operation S406). The EGO metric is calculated from attribute information of each client node with EGO intent being 1. As and when a new device joins the group, the GO node 101 calculates the EGO metric and updates the EGO list, if required. The EGO list consists of k nodes and is shared with all the associated clients whenever there is an update in the EGO list, which may be caused, as described later, by some new node with better potential joining the group or a node in the EGO list leaving the group or an existing client sending EGO intent and better credentials than what it had at the time of joining the group (for example, the node can be a smartphone which had very less battery power when it joined the group, but thereafter it was plugged in to a power supply), else in the periodic beacons. When the GO node 101 receives EGOi=0 from the client node 106 (Operation S404; NO), the client node 106 is joined to the group as normal client (Operation S407).

3.2) EGO List Creation when a Group Already Exists

Figure 9:
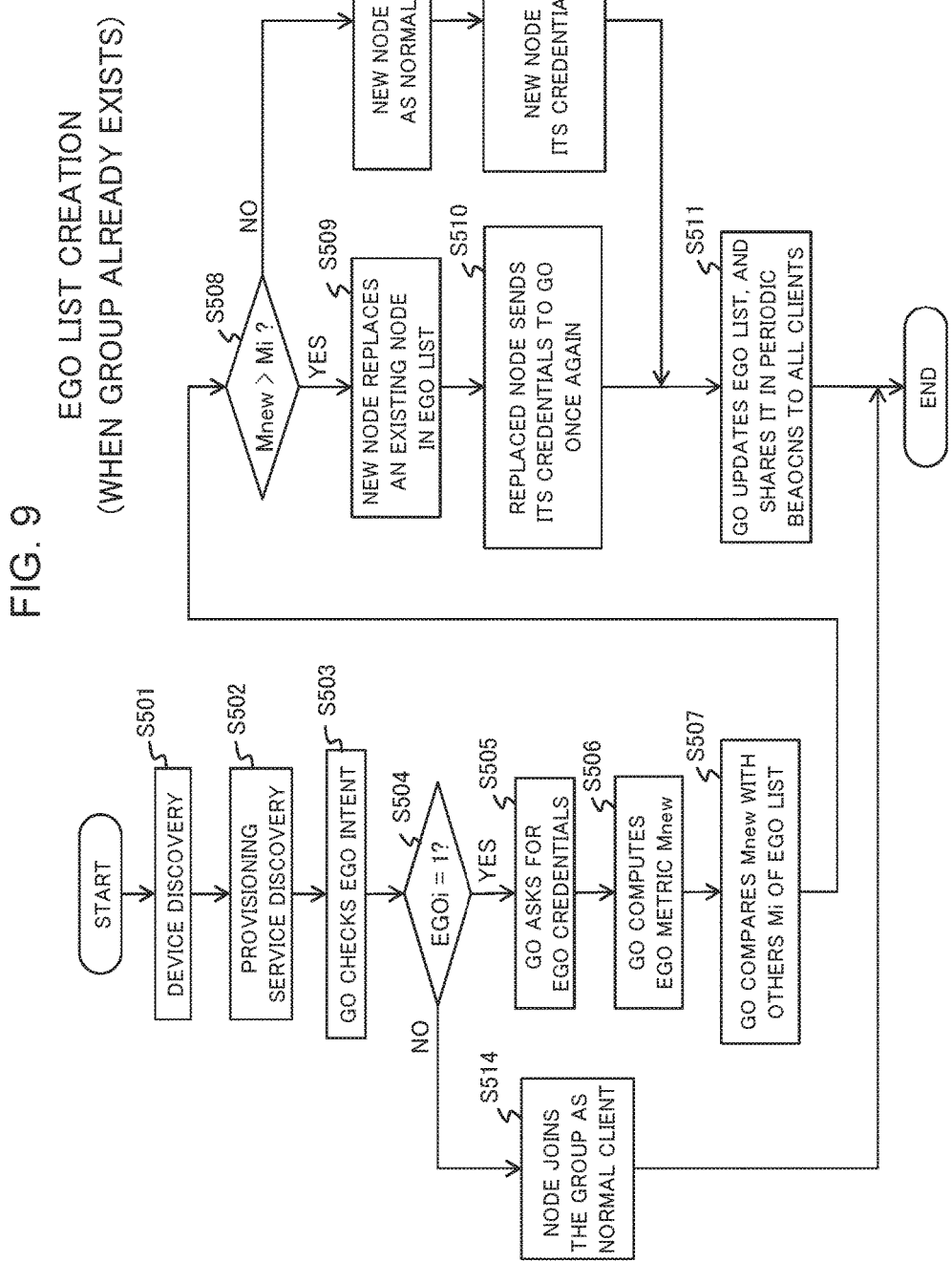
FIG. 9 is a flowchart showing the operation of creating an EGO list when a group already exists according to the embodiment of the present invention.

Referring to FIG. 9, the GO node 101 and a node 103, for example, are found through the Device Discovery procedure (Operation S501) and the GO node 101 joins the node 103 to the group I through the Provisioning Service Discovery procedure (Operation S502). Since EGOi is embedded in Provisioning Service Discovery frame received from the client node 103, the GO node 101 checks EGOi flag of the client node 103 during Provisioning Service Discovery (Operation S503). In another possible example, the GO may ask for EGO intent after group formation instead of including in the Provisioning Service Discovery frame.

If the GO node 101 receives EGOi=1 (non-zero) from the client node 103 (Operation S504; YES), the GO node 101 asks for EGO credentials (Operation S505). When having received the EGO credential information from the client node 103, the GO node 101 calculates an EGO metric $M_{new}$ based on the received EGO credential information (Operation S506) and then compares the calculated EGO metric $M_{new}$ with the EGO metric Mi of each existing EGO node in the EGO list 203 (Operation S507).

If the EGO metric $M_{new}$ is better than the EGO metric Mi of an existing EGO node (Operation S508; YES), the client node 103 replaces the existing EGO node as a new entry in the EGO list 203 (Operation S509). Thereafter, the replaced node 103 sends its credentials once again (Operation S510). For example, the node 103 is asked to send its credentials when vacancy is advertised by the EGO node. However, it is not necessary that it has to be a 'Vacancy' to trigger an ordinary client to send its EGO credentials to the GO node. In a rare case, it may happen that a node has attained a better credential later compared to what it had at the time of joining the group. For example, a smartphone or laptop which was running on limited battery power at the time of joining the group, so its EGO metric turned out to be low. But at a later time after joining the group, it got connected to steady power supply which will increase it EGO metric now. So, a client can resend its credentials anytime instead of waiting for vacancy. In other words, a client may not wait for a VACANCY NOTICE from the GO node to send its credentials, instead the client can immediately send its credentials if there is a positive update in its parameters. Accordingly, the GO node 101 can quickly calculate the metric, compare it with the metrics of the nodes in EGO list and decide to accept or reject. After receiving the credentials from the replace node 103, the GO node 101 updates the EGO list 203 and then shares the EGO list 203 with all the client nodes 106 and 103 (Operation S511).

If the EGO metric $M_{new}$ is not better than the EGO metric Mi of an existing EGO node (Operation S508; NO), the client node 103 joins as a normal client (Operation S512). Thereafter, the new node 103 sends its credentials (Operation S513). For example, when there is a vacancy in the EGO list, the GO node 101 asks the new node 103 to send its credentials once. However, as described above, it is not necessary that it has to be a 'Vacancy' to trigger an ordinary client to send its EGO credentials to the GO node. Thereafter, the GO node 101 updates the EGO list 203 and then shares the EGO list 203 with all the client nodes 106 and 103 (Operation S511). When the GO node 101 receives EGOi=0 from the node 103 (Operation S504; NO), the client node 103 joins the group as normal client (Operation S514).

3.3) EGO Selection

The GO may calculate the position index (p.i.) of an aspiring EGO as follows:

$$p.i. = \frac{\sum_i \{(x-x'_i)^2 + (y-y'_i)^2\}^{\frac{1}{2}}}{i} \quad \forall i, 1 \le i \le N \quad \text{[Math. 1]}$$

Here, (x, y) denotes the position of the aspiring EGO, $(x'_i, y'_i)$ denotes the position of each node in the group, and N denotes the number of clients in the group. The position index p.i. is used to select an EGO. For example, the node with minimum p.i. is positioned close to the centre of the network region in case of uniformly distributed nodes, or at least closest to the majority of nodes in a non-uniform node distribution, hence preferred over a node with high p.i.

However, there is a wide range of other parameters used by the GO for selecting an EGO. Since every node in the EGO list has to be compulsorily reachable from other nodes in the EGO list, the following condition is also needed:

$$\{(x-\bar{x}_j)^2 + (y-\bar{y}_j)^2\}^{1/2} < R_j \forall j, 1 \le j \le k \quad \text{[Math.2]}$$

Here, $(x_j, x_j\hat{})$ denotes the position of the $j^{th}$ EGO, where the symbol "^" of x^indicates the overbar on the letter x. Rj is the transmission range of the $j^{th}$ EGO and k is the number of EGOs in the EGO list. This ensures robustness of the proposed method in terms of maintaining connectivity during a sudden disruption as explained before.

Figure 10:
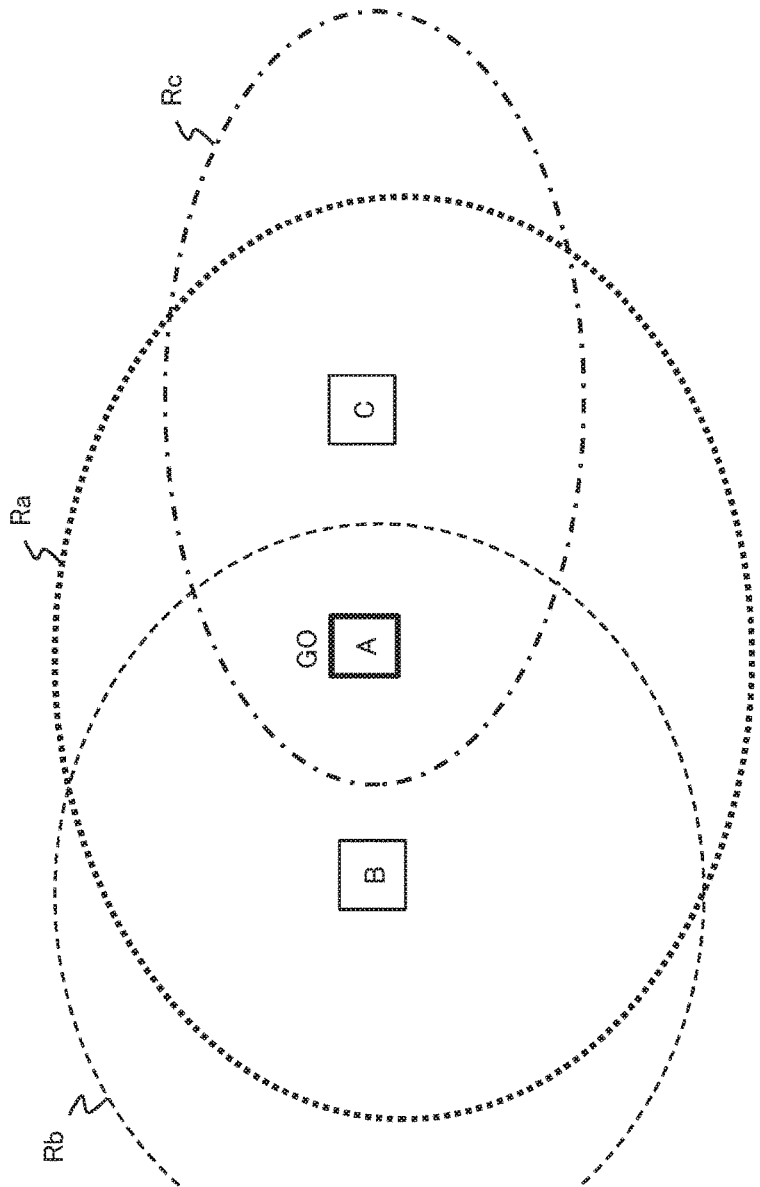
FIG. 10 is a schematic diagram showing transmission regions of nodes to explain the operation of the embodiment.

Referring to FIG. 10, the reason why the EGO condition is needed will be described. In a P2P network which typically comprises of a wide variety of devices like smartphone, laptop, printer, camera etc, it is quite common that each of the devices is of different transmission range. It is assumed that a GO node A along with client nodes B and C constitute a P2P group in which the nodes B and C are located within the transmission range Ra of the GO node A but the node C lies outside the transmission range Rc of the node C and the node B lies also outside the transmission range Rb of the node B. Accordingly, FIG. 10 shows a typical scenario where the GO node A can detect both the nodes B and C, but the nodes B and C cannot detect each other. Hence, if GOship is handed over to the node B, then the node C fails to connect it and vice-versa.

In order to maintain seamless connectivity even in such a P2P network, a list of EGOs is prepared for each node, instead of a single EGO, and it is made mandatory that each EGO should be reachable from all other EGOs. Thus, if a client fails to hear beacon from the highest priority EGO, it is more likely that it will be able to receive beacon from at least one of the EGOs. Out of all the received beacons, a client selects the highest priority EGO and joins it. In other words, when two nodes B and C who are associated to the same GO node A, they cannot hear each other directly as they lie outside each other's transmission region. Hence, if either of B or C is chosen as EGO, the other node cannot receive its beacon. Thus, the concept of multiple EGO (who are reachable from each other) is proposed to make the network more robust and fault-tolerant.

4. Example

Figure 11:
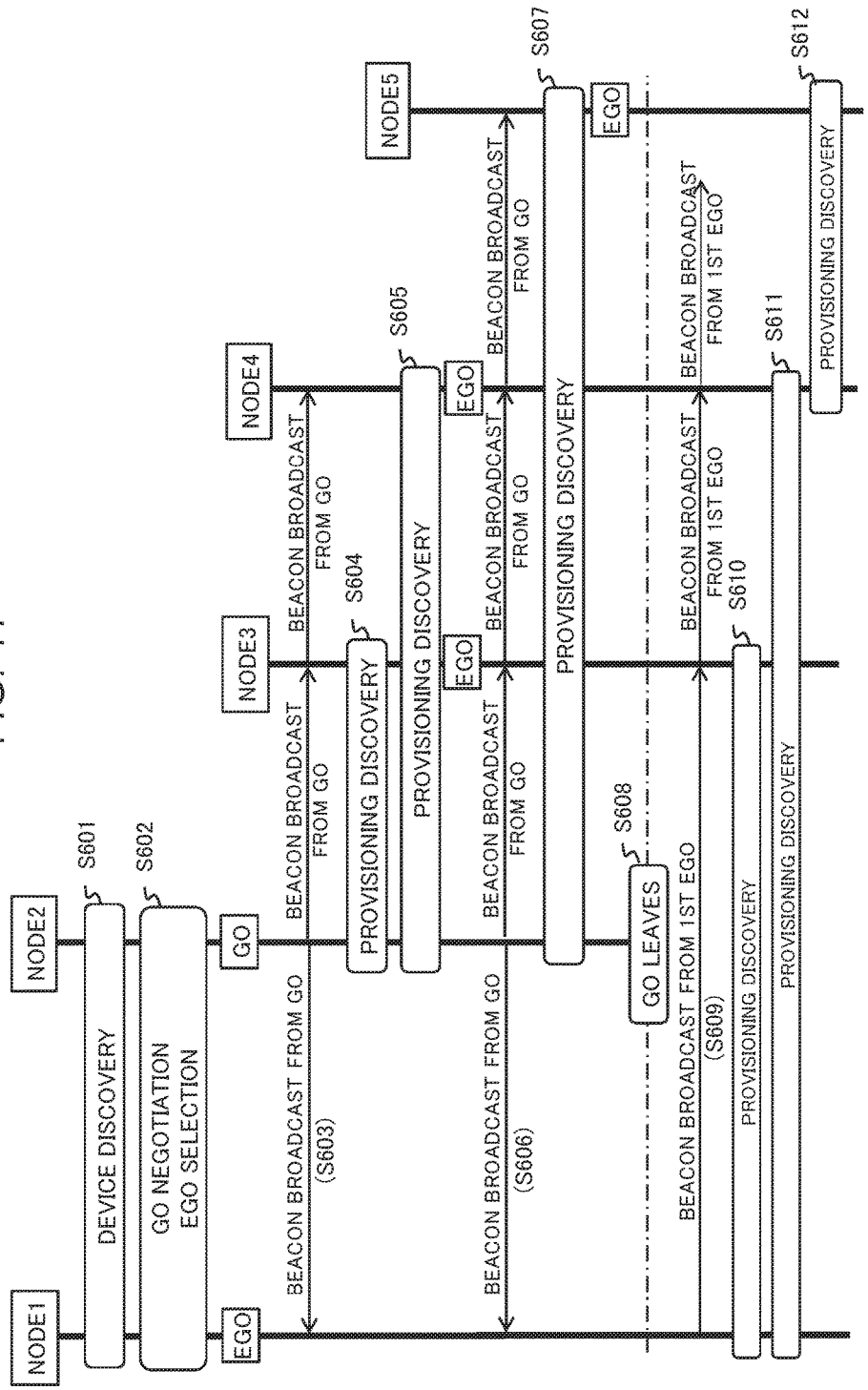
FIG. 11 is a timing sequence showing WiFi Direct with the proposed idea according to the embodiment.
Figure 12:
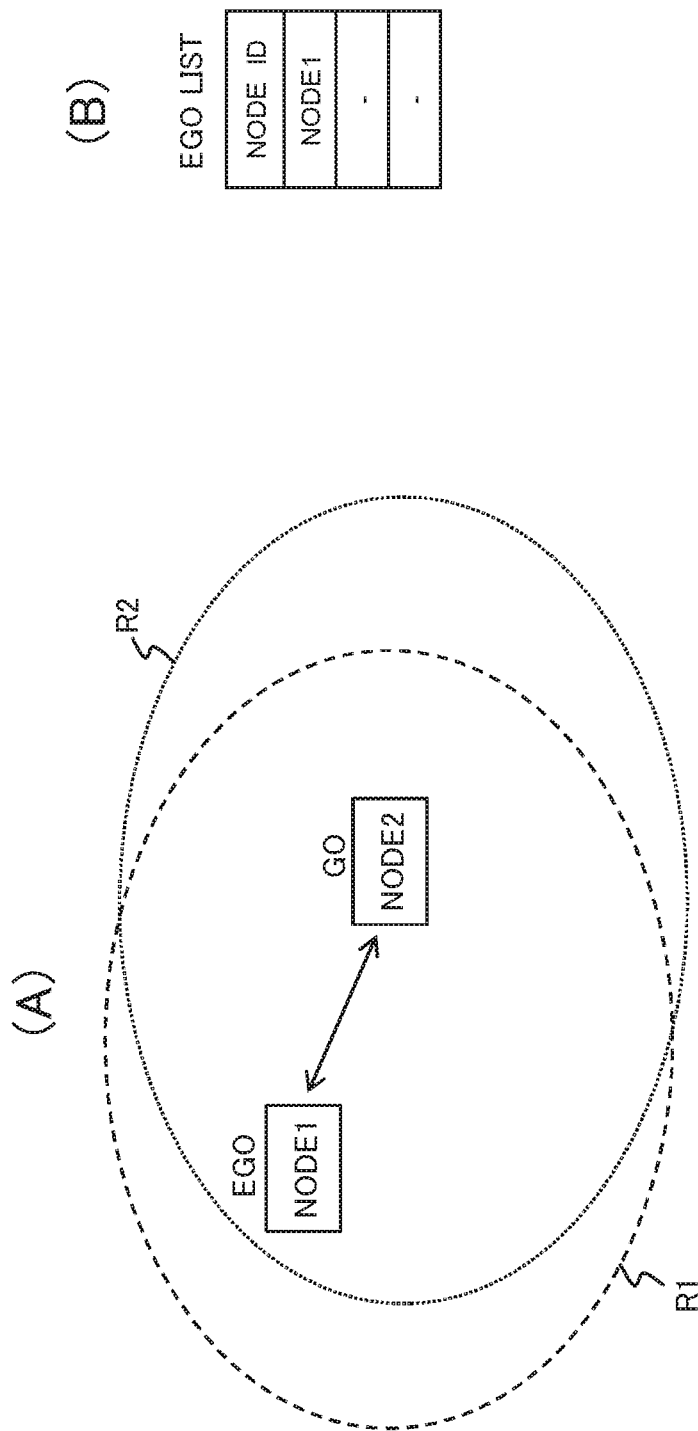
FIG. 12 is a schematic diagram showing an example of transmission regions of nodes to explain the operation of the embodiment.
Figure 13:
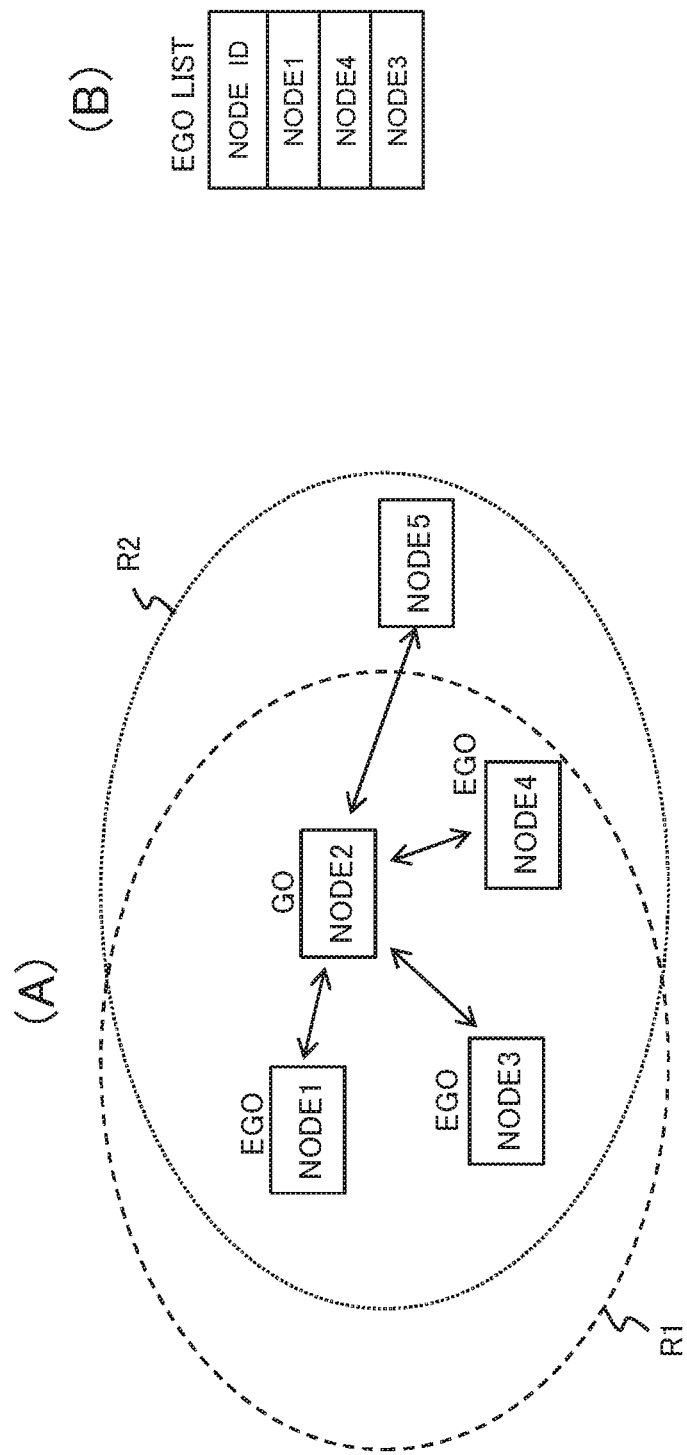
FIG. 13 is a schematic diagram showing an example of possible network topologies of the system to explain the operation of the embodiment.

Referring to FIG. 11, the sequence of frame exchange will be described with typical examples as shown in FIGS. 12-14. NODE1 and NODE2 alternately sends probe request and listens to the channels to discover each other (Operation S601). Once discovered each other, they undergo Group Owner Negotiation and EGO selection (Operation S602). More specifically, in GO Negotiation, NODE2 gets selected as GO and NODE1 expresses its intent to become an Emergency Group Owner (EGO) in the P2P connect message, which is shown in FIG. 12(A). NODE1 shares its credentials with NODE2 to become EGO as shown in FIG. 12(B). The Node ID of the EGO list in FIG. 12(B) is the MAC Address of an EGO node (NODE1) by way of example.

Next, NODE2 sends out beacon broadcast which is heard by NODE3 and NODE4 (Operation S603). They send P2P Connect frames (Provisioning Discovery Request) to NODE2 and connect to the GO node NODE2 (Operations S604 and S605). Both NODE3 and NODE4 individually share their EGO credentials with NODE2. Next, NODE2 sends out beacon broadcast which is heard by NODE5 (Operation S606). NODE5 exchanges Provisioning Discovery frames to NODE2 and connects to the GO node NODE2 (Operations S607). NODE5 shares its EGO credentials with NODE2. NODE2 calculates its metric, updates the EGO list and sends out broadcast message containing the list of k (k=3 in this example) EGOs. In this manner, NODE2 is connected to all client nodes as shown in FIG. 13(A) and share the EGO list as shown in FIG. 13(B). The Node ID of the EGO list in FIG. 13(B) is the MAC Address of each EGO node (NODE1, NODE4, NODE3) by way of example.

When NODE2 leaves (Operation S608), all the EGOs (i.e. NODE1, NODE3 and NODE4 in order of priority) sends out broadcast beacons on the same operating channel using CSMA/CA (Operation S609). NODE3 and NODE4 can listen to beacons of the first-priority EGO NODE1 and connects to it. NODE5 fails to receive the beacon of NODE1, and joins the next priority EGO, i.e, NODE4 as shown in FIG. 14.

Preferably, when the GO node 101 leaves and EGOs starts beaconing as Autonomous GO, the client nodes send P2P invitation requests to connect to them using the security keys of the previous session, instead of exchanging P2P connect frames which will generate new keys. By doing this, the GO negotiation and initial part of WPS (Wireless Protected Setup) which generates new security keys can be removed. Thus, by skipping GO negotiation and using old keys, the time of reconnection can be reduced.

FIGS. 11-13 are intended to explain an example scenario where NODE2 happens to be the GO of a group. The GO maintains a list of k EGOs (k=3 in this example) where NODE1 is the first-priority EGO and NODE4 is the second-priority EGO. When the GO (NODE2) disappears, all nodes connect to NODE1. NODE5 connects to NODE4 after failing to connect to NODE1.

INDUSTRIAL APPLICABILITY

This invention can be applied to wireless peer-to-peer (P2P) networks.

REFERENCE SIGNS LIST 101-106 Node
201 Radio system
202 User controller
203 EGO list
204 Processor
205 Memory

The invention claimed is:

1. A method for controlling group reformation in a wireless peer-to-peer group of nodes, wherein one of the nodes acts as a leader and others act as clients of the group, the method comprising:

preparing an emergency leader list during or immediately after group formation, wherein the emergency leader list prioritizes a predetermined number of emergency leader nodes each of which is a client node having intent of acting as an emergency leader;

broadcasting beacons from the emergency leader nodes of the emergency leader list when a leader node disappears from the group without notice; and connecting each of the client nodes barring a first-priority emergency leader node of the emergency leader list to a highest priority one of emergency leader nodes detected by the client node, wherein the emergency leader nodes of the emergency leader list are chosen based on factors including position indices of the emergency leader nodes, wherein each of the position indices represents a mean relative distance of each emergency leader node from the rest of the group members.

2. The method according to claim 1, wherein each emergency leader node of the emergency leader list is reachable from the other nodes.

3. The method according to claim 1, wherein the first-priority emergency leader node acts as a new leader by default.

4. The method according to claim 1, wherein the client nodes barring the first-priority emergency leader node are connected directly to the first-priority emergency leader node.

5. The method according to claim 4, wherein the client nodes barring the first-priority emergency leader node are connected to the first-priority emergency leader node using peer-to-peer invitation reusing security keys of a previous session.

6. The method according to claim 1, wherein when a client node fails to detect the first-priority emergency leader node but successfully detects a next-lower-priority emergency leader node, the client node is connected to the first-priority emergency leader node via the next-lower-priority emergency leader node.

7. The method according to claim 6, wherein the first-priority emergency leader node subdivides a transmission timeframe into a plurality of time phases, one of which is used for transmission to the client node via the next-lower-priority emergency leader node.

8. The method according to claim 1, wherein the group is a Wi-Fi Direct peer-to-peer group and the leader is a Group Owner of the Wi-Fi Direct peer-to-peer group.

9. A system for controlling group reformation in a wireless peer-to-peer group of nodes, wherein one of the nodes acts as a leader and others act as clients of the group, wherein each of the nodes is provided with an emergency leader list which prioritizes a predetermined number of emergency leader nodes each of which is a client node having intent of acting as an emergency leader, wherein the emergency leader list is prepared during or immediately after group formation;

the emergency leader nodes of the emergency leader list broadcast beacons when a leader node disappears from the group without notice; and each of the client nodes barring a first-priority emergency leader node of the emergency leader list connects to a highest priority one of emergency leader nodes detected by the client node, wherein the emergency leader nodes of the emergency leader list are chosen based on factors including position indices of the emergency leader nodes, wherein each of the position indices represents a mean relative distance of each emergency leader node from the rest of the group members.

10. The system according to claim 9, wherein each emergency leader node of the emergency leader list is reachable from the other nodes.

11. The system according to claim 9, wherein the first-priority emergency leader node acts as a new leader by default.

12. The system according to claim 9, wherein the client nodes other than the first-priority emergency leader node are connected directly to the first-priority emergency leader node.

13. The system according to claim 12, wherein the client nodes barring the first-priority emergency leader node are connected to the first-priority emergency leader node using peer-to-peer invitation reusing security keys of a previous session.

14. The system according to claim 9, wherein when a client node fails to detect the first-priority emergency leader node but successfully detects a next-lower-priority emergency leader node, the client node is connected to the first-priority emergency leader node via the next-lower-priority emergency leader node.

15. A node device of a wireless peer-to-peer group, wherein the node device acts as either a leader or a client of the group, comprising:

a wireless communication section that is configured to communicate with another node device;

an emergency leader list which prioritizes a predetermined number of emergency leader nodes each of which is a client node having intent of acting as an emergency leader, wherein the emergency leader list is prepared during or immediately after group formation; and a controller that is configured to control the wireless communication section such that, when a leader node disappears from the group without notice in a state of and when the node device is a first-priority emergency leader node of the emergency leader list, the wireless communication section broadcasts a beacon, receives beacons from the other emergency leader nodes of the emergency leader list, and connects as a new leader node of the group directly to each of the other client nodes listening to the beacon broadcast by the node device, wherein the emergency leader nodes of the emergency leader list are chosen based on factors including position indices of the emergency leader nodes, wherein each of the position indices represents a mean relative distance of each emergency leader node from the rest of the group members.

16. The node device according to claim 15, wherein the controller is further configured to control the wireless communication section such that when the leader node disappears from the group without notice and when the node device is an emergency leader node but not a first-priority emergency leader node of the emergency leader list, the wireless communication section broadcasts a beacon and connects to the first-priority emergency leader node of the emergency leader list.

17. The node device according to claim 16, wherein when connecting to another node device in response to the beacon broadcast, the controller is configured to control the wireless communication section such that the node device acts as a relay between said another node device and the first-priority emergency leader node.

18. The node device according to claim 15, wherein the controller is further configured to control the wireless communication section such that when the leader node disappears from the group without notice and when the node device is a client but not an emergency leader node, the wireless communication section listens to beacons from the emergency leader nodes of the emergency leader list and connects to a highest priority one of the emergency leader nodes of the emergency leader list.

* * * * *

UNITED STATES PATENT AND TRADEMARK OFFICE
CERTIFICATE OF CORRECTION

PATENT NO. : 10,270,850 B2
APPLICATION NO. : 15/123575
DATED : April 23, 2019
INVENTOR(S) : Prakash Chaki et al.

It is certified that error appears in the above-identified patent and that said Letters Patent is hereby corrected as shown below:

On the Title Page

Inventor section should read as follows:
Item (72) Inventors: Prakash Chaki, Tokyo (JP); Masato Yasuda, Tokyo (JP); Norihito Fujita, Tokyo (JP)

Signed and Sealed this
Ninth Day of March, 2021

Drew Hirshfeld
*Performing the Functions and Duties of the
Under Secretary of Commerce for Intellectual Property and
Director of the United States Patent and Trademark Office*